No. 4,533. REISSUED AUG. 29, 1871.

J. C. PFEIL.

PLOW.

Witnesses:-

Wm. H. Rowe

Jos. L. Peyton

Inventor:-

John C. Pfeil by his Atty

Wm. D. Bodamer

THE MORRIS PETERS CO., PHOTO-LITHO., WASHINGTON, D. C.

UNITED STATES PATENT OFFICE.

JOHN CASPER PFEIL, OF ARENZVILLE, ILLINOIS.

IMPROVEMENT IN PLOWS.

Specification forming part of Letters Patent No. 76,343, dated April 7, 1868; reissue No. 4,533, dated August 29, 1871.

*To all whom it may concern:*

Be it known that I, JOHN CASPER PFEIL, of Arenzville, in the county of Cass and State of Illinois, have invented certain new and useful Improvements in Rotary Cutters for Plows, of which the following is a specification:

The objects of my invention are, first, to allow the cutter or colter of a plow a limited amount of vibration or lateral play on its spindle, in order that it may conform to the line of draft of the plow; and, secondly, to render the colter adjustable to secure its proper relation to the plow-share.

In the accompanying drawing all my improvements for attaining these ends are shown as embodied in one machine, of which so much only is shown as is necessary to illustrate the invention herein claimed.

Figure 1:
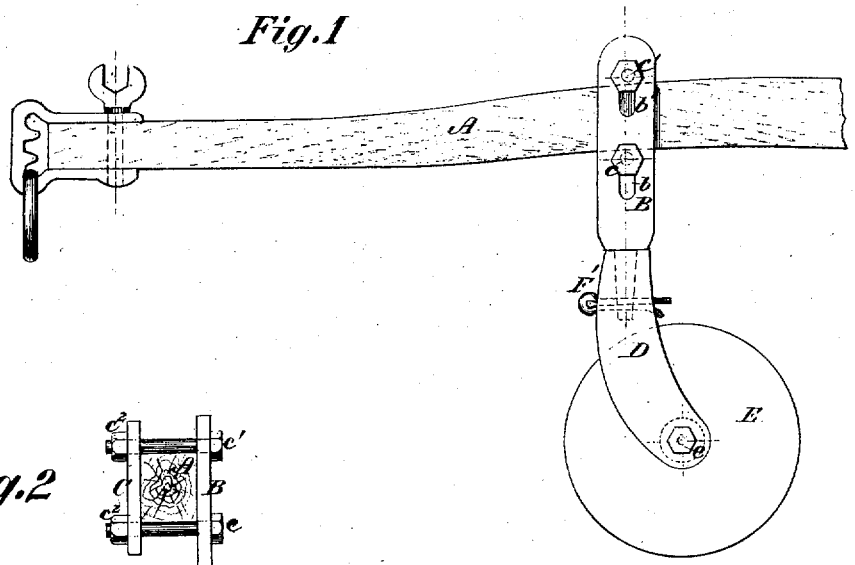
Figure 2:
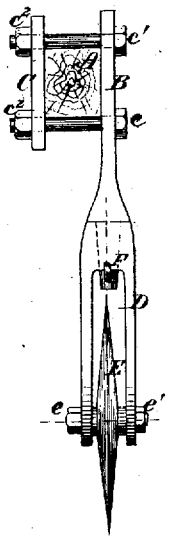
Figure 3:
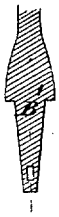
Figure 4:
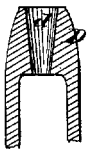
Figure 5:
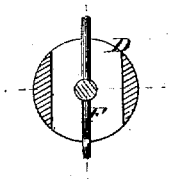

Figure 1 is a side view; Fig. 2, a front view; Fig. 3, a transverse vertical section through the caster-spindle, detached; Fig. 4, a similar view of the yoke or collar of the spindle; Fig. 5, a horizontal section through the collar and spindle just above the locking-pin which unites them.

The plow and plow-beam A are of well-known construction, and need no description here. The cutter-arm B is provided with vertically-elongated slots $b$ $b'$ to receive the bolts $c$ $c^1$, by which it is secured to the beam. In this instance one bolt passes above and the other below the beam. Each bolt passes through a plate or washer, C, on the side opposite the cutter-arm, and is held by a nut, $c^2$. It is obvious that the cutter-arm may be firmly clamped to the beam by the nuts, or that, by loosening them, the cutter-arm may be moved up or down, the bolts moving in the slots. The flat surface of the washer-plate and that of the arm afford a better clamping-surface than a round-iron clasp, such as ordinarily used to effect this result. This mode of clamping the arm to the beam obviates the necessity for cutting the beam, and leaves its strength unimpaired. The arm terminates below in a spindle, B′, which, in this instance, tapers slightly toward its lower end. A yoke or collar, D, has a hole, $d$, in its top to receive the spindle B′, which turns freely therein. A cutter or colter, E, rotates on a bolt, $e$, passing through the arms of the yoke and secured by a nut, $e'$. A pin, F, of the form shown, or any other suitable form, passes through a slot in the spindle B′, projecting beyond the spindle at each end. This pin not only serves to lock the yoke and spindle together, but also serves to limit the vibration of the colter by striking against the arms of the yoke, as will readily be understood from an inspection of the drawing. I have shown in this instance a self-holding spring-pin, formed by bending a stout wire to form a head, and having two prongs, which can be forced apart, after being inserted in the spindle, to prevent its accidental displacement, while admitting of its being readily removed.

The tapering spindle and collar shown are preferred, because they insure a snugly-fitting joint at all times, for, as the hole enlarges by wear, the top of the yoke is also worn away by attrition, and the yoke moves upon the spindle enough to prevent the joint becoming loose.

My improved colter thus can be set to cut to a greater or lesser depth. The plow can also be lifted out of the ground or turned without cramping the colter or getting it wrong end foremost, which is objectionable, as the colter is liable to be injured in resuming its normal position.

My device is peculiarly advantageous when used in combination with a gang or sulky-plow.

I do not broadly claim the principle of adjusting a colter, or of vibrating a rotary colter, as these effects have heretofore been produced.

I claim as my invention—

1. The combination of the slotted spindle on the arm of the colter, the yoke slotted to receive the spindle, and the locking-pin limiting the vibration of the colter, all these members being constructed and operating as hereinbefore set forth.

2. The combination of the plow-beam, the clamping-bolts, the vertically-slotted arm, its slotted spindle, the yoke slotted to receive the spindle, and the locking-pin, all these members being constructed and operating in combination, as hereinbefore set forth.

3. The combination of the colter, its slotted yoke turning on a fixed spindle, and the spring-pin passing transversely through the spindle and serving to limit the vibration of the colter, as well as to connect the spindle and colter, all these members being constructed and operating in combination, as hereinbefore set forth.

4. The combination, in a plow-colter, of the vertically-adjustable arm, the downward-tapering spindle thereon, and the colter-yoke having an upwardly-flaring hole or socket therein to receive the spindle, all these members being constructed and operating as hereinbefore set forth, to compensate wear of the spindle or socket to secure a snug joint and to prevent the wabbling of the colter-yoke upon the spindle.

5. The combination of the tapering spindle of the colter-arm with the spring locking-pin passing transversely through it parallel with the face of the arm, these members being constructed and operating as hereinbefore set forth.

JOHN CASPER PFEIL.

Witnesses:
JOHN W. MOORE,
ALBERT SELDNER.